Feb. 12, 1935.      W. L. HAWKINS      1,991,209
SPARE WHEEL OR TIRE LOCK
Filed Oct. 4, 1930
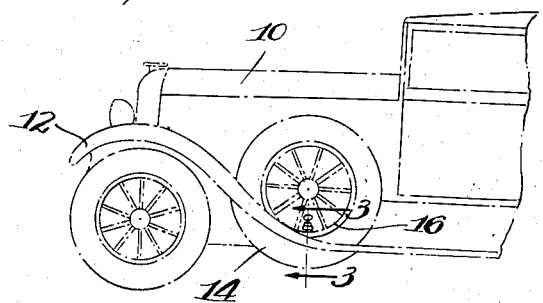
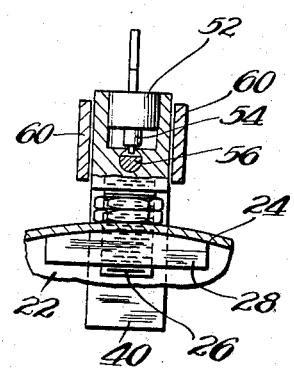
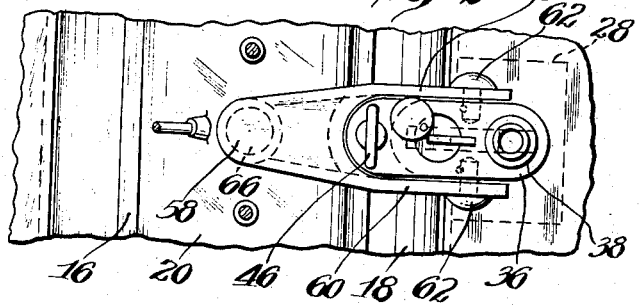
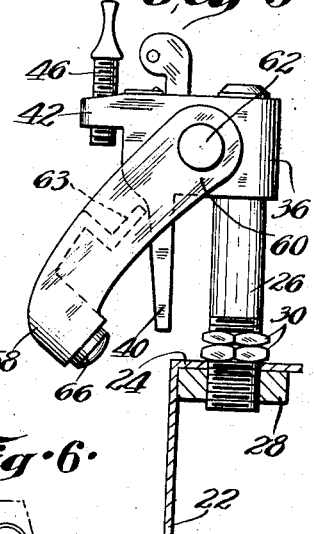
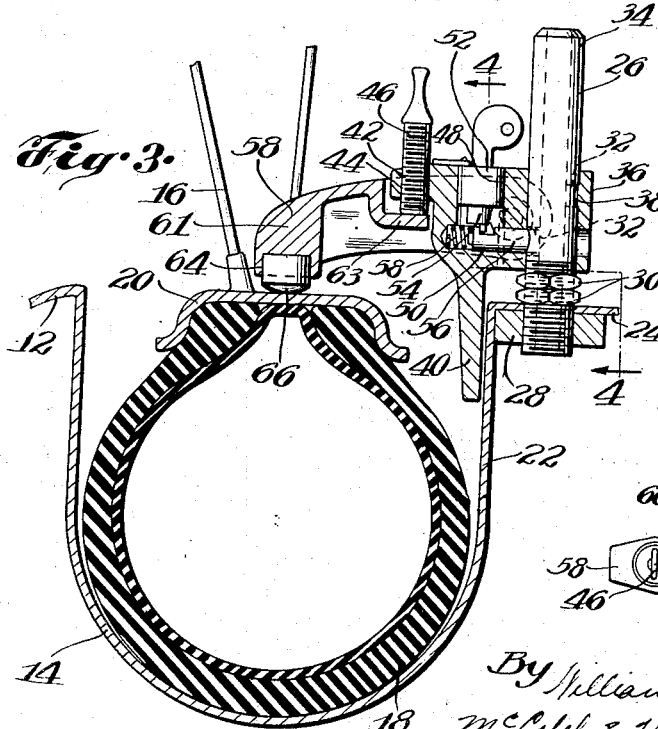
INVENTOR
Walter L. Hawkins
By Williams, Bradbury,
McCaleb & Hinkle
ATTORNEYS Patented Feb. 12, 1935

1,991,209

UNITED STATES PATENT OFFICE 1,991,209

SPARE WHEEL OR TIRE LOCK

Walter L. Hawkins, St. Louis, Mo., assignor, by mesne assignments, to Oakes Products Corporation, Detroit, Mich., a corporation of Michigan Application October 4, 1930, Serial No. 486,311

2 Claims. (Cl. 70—90)

My invention relates generally to spare wheel or spare tire locks and is more particularly adapted to the provision of locking elements for securing spare wheels or spare tires in the fender wells of automobiles.

One of the objects of my invention is to provide a locking means of the above-mentioned type for securing a spare wheel or tire in the fender well and holding it against undue vibration.

Another object of my invention is the provision of a lock which is easily releasable to permit the removal of a spare wheel or tire.

Another object of my invention is the provision of adjusting means for increasing or decreasing the pressure with which the locking element forces the spare wheel or spare tire into the fender well.

A further object of my invention is the provision of an improved lock of the above-mentioned type adapted to be so placed with regard to the spare wheel and the fender well that unwarranted manipulation of the lock elements is extremely difficult, yet manipulation of the lock by a person with the proper key is very simple.

Another object of my invention is to provide an improved spare wheel or tire lock construction capable of adjustment to securely hold tires or wheels of different sizes in place in the fender well of the automobile.

Other objects and advantages will be more apparent as the description progresses, reference being had to the accompanying drawing, in which:

Figure 1 is a side elevation of a portion of an automobile provided with fender wells in the front fenders all shown in dotted lines, with the spare wheel lock of my invention shown in full lines;

Figure 2 is a full size fragmentary plan view of the fender well with a spare wheel and tire locked in place with my improved locking device;

Figure 3 is a cross sectional view through the fender well, taken generally on the lines 3—3 of Fig. 1;

Figure 4 is a vertical sectional view through a portion of the lock elements, taken generally on the line 4—4 of Fig. 3;

Figure 5 is a changed position view of the lock elements shown in Fig. 3; and

Figure 6 is a plan view on a reduced scale of the lock elements showing a dotted line position of the lock elements in a releasing position.

In the drawing 10 represents an automobile provided with front fenders 12 in which the fender wells 14 are formed for the purpose of carrying a spare wheel or tire. The fender wells are of the usual construction, forming a substantially U-shaped pocket in the fenders. A spare wheel 16 may be placed in a fender well 14, having the usual tire 18 mounted upon the rim 20. The rear wall 22 of fender well 14 extends upwardly to about the height of the rim 20 of the spare wheel that is placed in the fender well. From this point a horizontal wall 24 extending toward the body is provided in the fender 12 on which a mounting post 26 is vertically positioned.

The mounting post 26 is screw-threaded at its lower end and may be rigidly secured upon the horizontal wall 24 by means of a rectangularly shaped nut portion 28 screwed thereon and adapted to have one side rest against the perpendicular wall 22 of the fender well and its upper face against the lower side of the horizontal wall 24.

A pair of lock nuts 30 is screw-threadedly mounted on the post 26 above the wall 24 and serves rigidly to lock the post on wall 24. The post 26 is provided with a plurality of openings 32 and a beveled upper end 34. A lock carrying block 36 is provided with a bore 38 and is adapted to be positioned upon the mounting post 26. The lock carrying block 36 has a downwardly extending lug 40 adapted to lie adjacent the vertical wall 22 of the fender well and a laterally extending flange 42 provided with a tapped opening 44 in which a set screw 46 is screw-threadedly mounted. A second bore 48 is provided in the block 36 parallel to the bore 38 and an opening 50 at right angles thereto is adapted to form a passageway connecting both bores. A lock cylinder 52 is positioned in the bore 48 provided with a lock barrel 54 which engages a locking pin 56 to move the locking pin in a forward and backward direction.

A compression spring 58 positioned in the bore 50 normally tends to force the locking pin 56 forward. The lock cylinder 52, barrel 54, and lock ward. The lock cylinder 52, barrel 54, and lock pin 56 may be of any well-known construction wherein by the insertion and rotation of a key in one direction the locking pin 56 will be moved forwardly and by a reverse movement of the key the locking pin 56 will be moved in a backward direction.

A wheel retaining member 58 formed with a pair of arms 60 is pivotally secured on the lock carrying block 36 by means of pins 62 which pass through openings in the arms 60 and are suitably engaged in the block 36. The wheel retaining member 58 has a forward portion 61 adapted to overlie the rim of a wheel that may be placed in the fender well 14 and also has a downwardly stepped portion 63 adapted to underlie the set screw 46. For the purpose of preventing a metal to metal contact between the wheel retaining member and the rim of the spare wheel, the portion 61 is provided with an opening 64 in its lower face in which a resilient pad 66 may be placed which extends beyond the edge of the opening and makes contact with the rim of the wheel 16 carried in the fender well.

In its normal locking position the lock carrying block is in the position shown in Fig. 3 with the locking pin 56 extending into the lower opening 32 in the mounting post 26. In this position the wheel retaining member will be pivotally carried upon the block 36 by the pins 62 and may swing downwardly, but its upward movement is limited by the portion 63 engaging the lug 42 of the block 36. If a wheel has been placed in the fender well prior to the positioning of the lock, the pad 66 will be resting against the rim of the spare wheel and will prevent a withdrawal of the spare wheel from the fender well. If the wheel in the fender well is of a slightly smaller diameter than normal the pad 66 may be brought to bear against the rim by an adjustment through the set screw 46, thus eliminating any possibility of movement of the spare wheel because it is now tightly held.

To withdraw a spare wheel from the fender well, the locking pin 56 is withdrawn from the opening 32 by the manipulation of a proper key and the block 36 and retaining member 58 may be raised upon the mounting post 26 to the position shown in Fig. 5, at which time the retaining member will swing downwardly and a spare wheel being withdrawn, will easily clear its outer edge. If, for any reason, the spare wheel does not clear the entire assembly, that is, the lock 36 and the member 58, they may be rotated upon the post 26, as shown in Fig. 6, to completely clear the fender well 14. If a wheel of a much smaller size is placed in the fender well the wheel may also be securely locked in position by adjusting the retaining member by means of the set screw 46.

When the device is in its locked position the removal of the mounting post 34 by unscrewing is precluded in two ways: First, the body 36 is locked to the mounting pin so that it would have to rotate with the pin if the pin were turned. The depending lug 40 of the body, however, prevents rotation. Second, the locking pin 56 locks the body 36 to the mounting pin immediately above the nut and lock nut 30—30 so that the latter cannot be manipulated sufficiently to loosen the mounting pin and permit its rotation. Also the lower threaded end of the mounting pin 26 may be peened over the nut 28 permanently to prevent removal of the mounting pin.

While I have illustrated and described a single embodiment of my invention, it will be understood that numerous changes and modifications may be made, and I do not wish to limit myself to the specific construction shown but rather, what I desire to secure by United States Letters Patent is:

1. A lock for a spare wheel assembly comprising in combination a post mounted upon a support, a lock body member mounted upon said post, a wheel engaging arm pivotally connected to said body member, a lug on said body member, a stop on said wheel-engaging arm abutting said lug to limit its upward movement, and locking means in said body member for securely holding the body member in a predetermined position upon said post.

2. A lock for a spare wheel assembly comprising in combination a cylindrical post mounted upon a support, a body member slidably mounted upon said post, a lock cylinder in said body member, a lock bolt actuated by said lock cylinder, said post having openings adapted to receive said lock bolt, a bifurcated wheel-engaging arm pivotally connected to the sides of said body member, means for limiting the upward movement of said wheel-engaging arm with respect to said body member, and a resilient pad in the lower end of said wheel-engaging arm for contacting a wheel.

WALTER L. HAWKINS.